July 19, 1955 M. CAMRAS 2,713,462

TAPE REEL SUPPORT

Filed Jan. 8, 1949 2 Sheets-Sheet 1

Inventor
Marvin Camras
by The Firm of Charles W. Hills Attys

July 19, 1955 M. CAMRAS 2,713,462

TAPE REEL SUPPORT

Filed Jan. 8, 1949 2 Sheets-Sheet 2

Inventor
Marvin Camras by The Firm of Charles W. Hills Attys

United States Patent Office 2,713,462 Patented July 19, 1955

2,713,462

TAPE REEL SUPPORT

Marvin Camras, Chicago, Ill., assignor to Armour Research Foundation of Illinois Institute of Technology, Chicago, Ill., a corporation of Illinois Application January 8, 1949, Serial No. 69,905

4 Claims. (Cl. 242—68)

This invention relates to means for mounting and securing rolls of tape in apparatus in which they are used, and more particularly, to means adaptable to mounting and securing rolls of tape of more than one width.

It is common practice in apparatus making use of tape members wound in the form of a roll, to wind the members on reels such as those used in the winding of movie film. In the field of magnetic recording, for instance, tape record members on which recordings are made are wound on reels having a form similar to enlarged narrow spools consisting of a hub or central core with two circular guide walls extending from the core. It has been found simpler and much more economical to wind such members on a simple core without the need for guide wall extensions, but the difficulty encountered with such rolls is that no simple roll mounting and securing means existed heretofore to enable their use.

It is, therefore, an important feature and object of my invention to provide a new means for mounting and securing tape members wound in the form of a simple roll.

Another object of the present invention is to provide a new improved means for mounting magnetic record members wound in the form of a roll without the need for a reel.

A further object of the present invention is to provide a simplified record roll mounting and securing means which will enable easy mounting and removal of record rolls.

A still further object of the present invention is to provide a record roll mounting with securing means by which a record roll may be automatically secured in mounted position by the mere physical action of pushing the roll onto the record mount.

Still another object of the present invention is to provide a record roll securing means adaptable to more than one size of roll.

Another and still further object of the present invention is to provide a record roll securing means adaptable to a rotatable mount.

Another object of the present invention is to provide a record roll securing means so arranged as to be able to accommodate more than one size of record roll on a rotatable mount.

The novel features which I believe to be characteristic of my invention are set forth with particularity in the appended claims. My invention itself, however, both as to its organization, manner of construction and method of operation, together with further objects and advantages thereof, may best be understood by reference to the following description, taken in connection with the accompanying drawings, in which:

Figure 1:
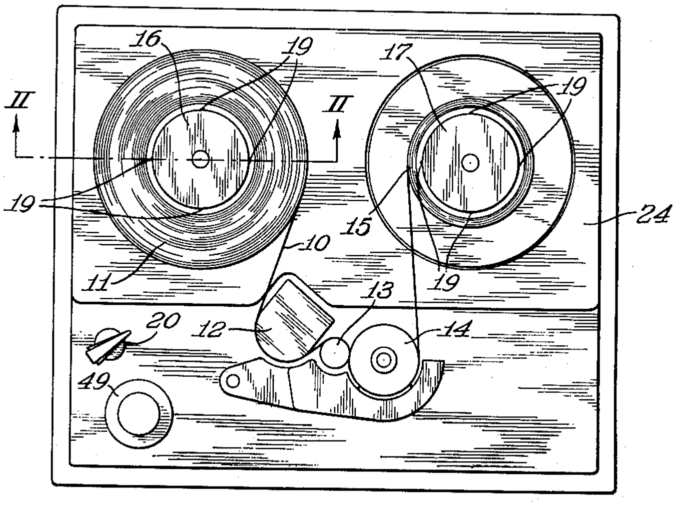
Figure 1 is a plan view of the magnetic recorder showing the supply and take-up rolls in mounted position.

Referring now to Figure 1 of the drawings, I have illustrated the general arrangement of a magnetic recording machine including a magnetic tape recording member 10 and the manner in which it is threaded from a supply roll 11 over an electromagnetic head assembly 12, around a drive roll 13, under a pinch roll 14, and then up to a take-up roll 15. Both the supply and take-up rolls 11 and 15 are self-supporting in that they need no under supporting surface when the tape member 10 is wound onto such rolls and no core projections exist beyond the limits of the tape roll width. When respectively positioned on a pair of roll mounts 16 and 17, the rolls 11 and 15 cooperate with the drive roll 13 to move the record member 10 over the magnetic head 12 during the recording, rewind and playback operation. The operation of the machine is controlled by an "on-off" switch 20, while direction of movement of the tape or record member 10 is controlled by a drive reversing switch 49.

Figures 2, 3:
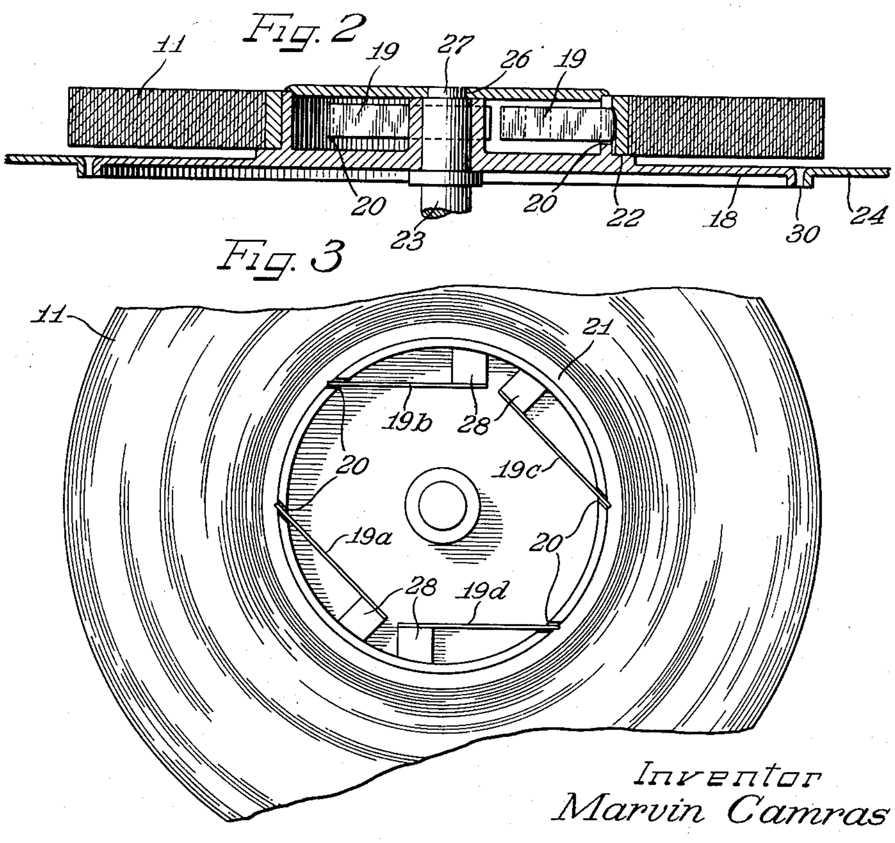
Figure 2 is an enlarged sectional view of one of the roll mounts as taken on line II—II of Figure 1.
Figure 3 is a fragmentary top view of one of the roll mounts with the cover removed from its hub to expose the roll securing means.

In one embodiment of my invention which is shown in Figures 2 and 3, both the supply and take-up rolls 11 and 15 are secured to their respective identical mounts 16 and 17 by a force supplied by the tips of four leaf spring fingers 19*a*, 19*b*, 19*c* and 19*d* which project from inside the hub 16*a* of the mount 16. As shown in Figure 2, the leaf spring fingers 19*a*, 19*b*, 19*c* and 19*d* within the hub of the roll mount project from apertures 20 provided in the hub side and protrude a sufficient amount to enable the tips to exert a spring force on the inner surface of the record roll core 21. Roll core 21 can be of any suitable material such as cardboard, Bakelite or metal. If made of soft material such as cardboard, the tips of the fingers 19*a*, 19*b*, 19*c* and 19*d* dig into the inner periphery of the core 21 to provide a holding or securing force for the record roll 11 and also to prevent rotational slippage. If, however, the core material is hard, the spring force alone, exerted by the tips of fingers 19*a*, 19*b*, 19*c* and 19*d* against the inner surfaces of the core, is sufficient to secure the roll and prevent rotational slippage due to the tendency of the fingers to bite into the core 21.

It is a feature of the present invention that rolls of width greater or smaller than the depth of hubs 16 and 17 may be mounted thereon just so long as the fingers projecting from their circumferential surfaces engage the core of the rolls.

The ability of the structure to prevent rotational slippage is greatly enhanced by the angular disposition of the fingers 19*a*, 19*b*, 19*c* and 19*d*. From an inspection of Figure 3 of the drawings, it will be observed that fingers are arranged in pairs with the two fingers of each pair converging toward each other as they pass through the openings 20 of the hub of the roll mount. Thus, fingers 19*a* and 19*b* form one pair, and fingers 19*c* and 19*d* form a second pair. Resistance to clockwise rotational movement of the roll 11 is provided mainly by fingers 19*b* and 19*d* due to the fact that the fingers 19*b* and 19*d* have great resistance to flexure when a force is applied inwardly in a plane making an acute angle with respect to the direction of extension of the spring.

Resistance to counterclockwise rotational movement of the roll 11 is principally provided by fingers 19*a* and 19*c*.

If desired, fingers 19*a* and 19*c* can be omitted from hub 16 since the force exerted in pulling the record member 10 from the supply roll 11 is in a clockwise direction which is suitably resisted to create a roll gripping force by fingers 19*b* and 19*d*. Similarly, fingers 19*b* and 19*d* can be omitted from the hub of the mount 17 where the usual operating force on the roll 15 is in a counterclockwise direction and is satisfactorily opposed by fingers 19*a* and 19*c*. The omission of fingers in this manner has the advantage that the rolls being loaded or removed from the hub may be turned in one direction to facilitate movement in a vertical direction on said mounts.

Figure 3 also shows in detail the manner in which the spring fingers 19*a*, 19*b*, 19*c* and 19*d* are secured at their inner ends to mounting blocks 28 to which they may be welded or otherwise suitably secured. The blocks 28 are similarly secured to the inner wall of the hub 16.

The roll mount 16 besides including a hub 16*a* includes a circular mounting plate 18 provided with a slightly raised platform portion 22 on which the mounted tape roll 11 rests. Roll mount 16 is fixed on a rotatable vertical shaft 23 and is so disposed that the plate portion 18 rotates within a panel aperture 30, flush with panel 24. Cover 25 for the hub of mount 16 is provided with a small mounting hole 26 which fits closely over the small diameter portion 27 of drive shaft 23. The edge of cover 25 is grooved, so that upon being placed over the hub 16*a*, a well sealed enclosure is provided for the leaf spring fingers 19*a*, 19*b*, 19*c* and 19*d*.

Figure 4:
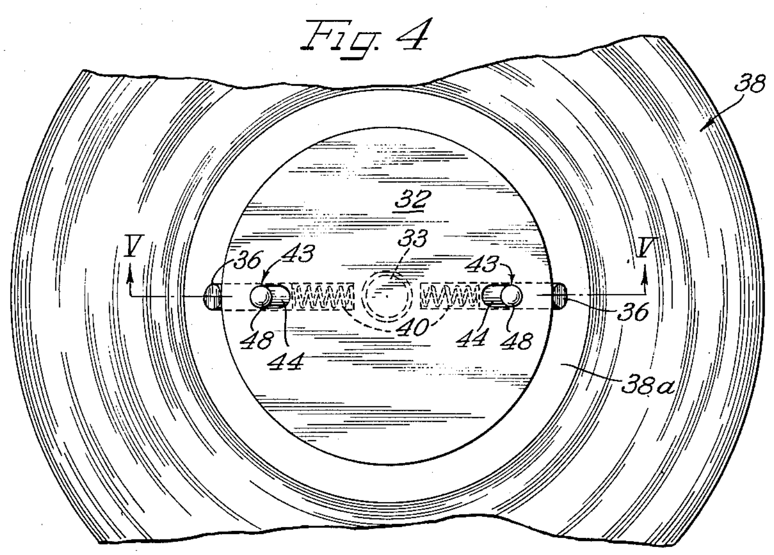
Figure 4 is a fragmentary top view of a roll mount illustrating another embodiment of the securing means of my invention.

Figure 4 shows a second embodiment of my invention in which a different type of securing mechanism for holding a tape roll 38 having a tape roll core 38*a* on a mounting hub 32 is disclosed. In this embodiment, the mounting hub 32 is provided with a roll seating ridge 32*a* at its lower edge projecting through a panel 32*b* and is adaptable to secure two different widths of tape roll, and in this respect, the hub is made deep enough to enable its accommodation of the widest of the two sizes of tape rolls. The ridge 32*a* extends outwardly for a distance less than the distance to which the outer circumference of the cores adapted to be mounted on the hub 32 extend. The seating surface of the ridge 32*a* is disposed slightly above the panel 32*b*, thus causing the rolls mounted thereon to clear the panel. This clearance, however, is sufficiently small to assure that any tendency for the record member to peel off the roll will not result in the tape slipping into the clearance space because of the sharp angular movement of the record tape required for such result to occur.

Figure 5:
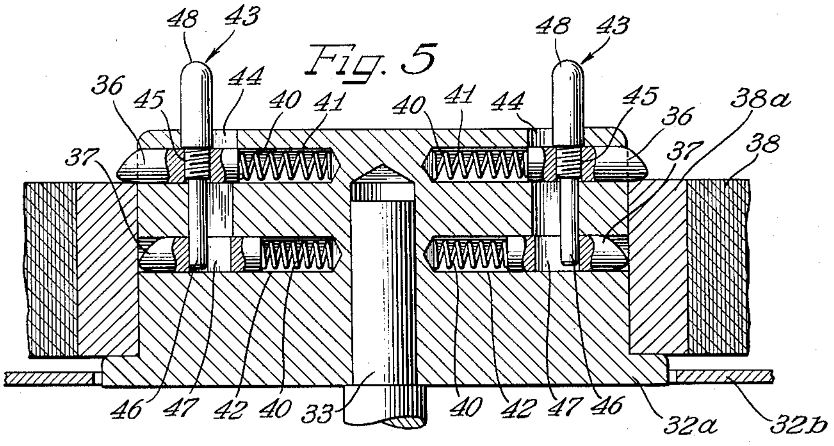
Figure 5 is a sectional elevation view of the embodiment shown in Figure 4 as taken on line V—V of Figure 4.
Figure 6:
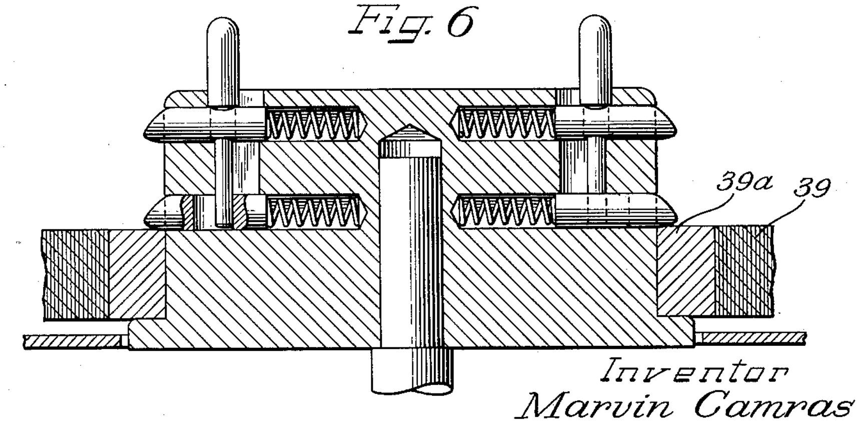
Figure 6 is another sectional view of the embodiment shown in Figure 4 like that taken on line VI—VI but with a tape roll of different width secured to the mounting.

Two sets of latch pins are provided in the hub 32, one set being a pair 36 disposed on an upper level of the hub 32 to accommodate and secure wide tape rolls, like roll 38 shown in Figure 5, while a pair of latch pins 37 at a lower level in the hub accommodate and secure narrow rolls as roll 39 on a roll core 39*a* shown in Figure 6. Each of the latch pins 36 and 37 is slidably fitted to a radially extending hole and backed by a compression spring 40 sufficiently long enough and having sufficient spring force to push their respective pins to a projected position from the holes within which they are fitted. In order to enable retraction of the latch pins 36 and 37, each of the two pairs are aligned so that the upper pins 36 are fitted to holes 41 extending diametrically opposite from each other and directly above diametrically opposite radially extending holes 42 in the lower level, so that a pair of retracting pins 43 extending from the top of hub 32, through a pair of vertical slots 44, may make engagement with both pairs of latch pins 36 and 37, to enable them to be withdrawn to recessed position within their respective holes. The vertical slots 44 extend from the top of hub 32 down to the level of lower pins 37, so that retraction pins 43 inserted therein may engage both the upper and lower latch pins. Each of the retraction pins 43 is provided with a threaded portion 45 along its shank by which it is theadably secured in a hole provided through its respective upper level latch pin 36. The lower end 46 of each of the retraction pins 43 makes engagement with a lower latch pin 37 in a slot 47 provided in the side of each of such latch pins 37.

When no roll is mounted on the hub 32, latch pins 36 and 37 are pushed to a slightly projected position under the influence of compression springs 40. The limit of projection is determined by the engagement of the pins 43 with the sides of hub slots 44 closest to the edge of hub 32. The limit of projection of the lower latch pins 37 is determined, in addition, by the length of slots 47 provided in their sides, since these pins will project outwardly as far as the lower end 46 of retraction pin 43 will allow, that is, the latch pins 37 will move outwardly until engagement is made between the sides of slots 47 and the edge of retraction pin end 46.

In order to allow a tape roll to be pushed over the latch pins 36 and 37, and to be secured when mounted, wedge-like tips are provided at the projecting ends of the latch pins. The tip of each such pin is not sharp, but slightly rounded, to avoid injury to the roll parts as they move over the hub, and is formed by the intersection of a relatively steep sloping surface extending from the top outer edge of the radial hole from which the pin projects and a relatively shallower sloping surface extending from the lower edge of the hole. Thus, when a roll, such as roll 38 of Figure 5, is pushed over the hub 32, the core of the roll first makes engagement with the steeply inclined top surfaces of the latch pins 36, and a component of the vertical placing force acts to push the pins in retracted position to allow passage of the roll to seated position. Similarly, when the roll engages the lower pins 37, these pins also retract to allow passage of the roll. Upon reaching seated position, the latch pins 36 are, by reason of their position at the upper level of the hub 32 above the edge of the roll, pushed by their respective backing springs 40 to projected position to secure the roll in such seated position. The securing force for the roll is a component of the force of the springs 40, exerted by the lower shallower slope of the pin ends which push the roll downward to a tighter seating position, and at the same time, provide a gripping action preventing rotational slippage of the roll on the hub. Rotational slippage is further prevented by the force of the lower latch pins 37, pushing against the inner periphery of the tape roll core.

When a narrower tape roll, such as roll 39 shown in Figure 6, is placed on the hub 32, it is pushed over both sets of latch pins 36 and 37, all of which retract to allow passage of the roll, and then return to projected position again. The lower projecting latch pins in this instance provide the securing force to hold the roll in seated position and to prevent its slippage.

If removal of a mounted roll is desired, finger grip portion 48 of retraction pins 43 are grasped and drawn together toward the center of hub 32 within their slots 44, thus causing both the upper and lower latch pins 36 and 37 to be drawn to recessed position within their respective mounting holes. When the latching pins are thus withdrawn from the circumferential surface of the hub, no obstructions remain to hinder removal of the roll. In the case of removing a wide tape roll from the hub, the lower latch pins 37 are already in recessed position when the retraction pins 43 are drawn toward the center of the hub. The slots 47 in the lower latch pins 37, however, are slightly smaller than hub slots 44, thus even when the pins are held in recessed position by the core of a wide tape roll, they may be withdrawn a slight amount more by retraction pins 43 to release the force they exert against the inner periphery of the roll core when removal is desired.

In summary, the latter embodiment of my invention, therefore, comprises essentially a hub which may be made to revolve on a shaft and which is of such depth that it can accommodate two sides of the tape. A pair of retractable latch pins extending radially from each side of the hub and diametrically opposite to each other are disposed at depths on the hub which will allow protrusion of the slidable latch pins mounted or slidably fitted within the holes allowing the smaller rolls to be latched into place by the lower latch pins and larger sizes of tape to be latched in place by the upper latch pins.

While I have shown particular embodiments of my invention, it will, of course, be understood that I do not wish to be limited thereto, since many modifications may be made, and I, therefore, contemplate by the appended claims to cover all such modifications as fall in the true spirit and scope of my invention.

I claim as my invention:

1. A rotatable circular hub affording means for mounting a tape roll, a spring biased roll-engaging member for securing tape rolls to said mount, said hub having holes provided in the circumferential surface thereof within which said roll-engaging members are slidably fitted, said hub also having slots extending from the top of said hub down to each of said roll-engaging members, movable stop members engaging each of said roll-engaging members to limit the extent of protrusion of said roll-engaging members from said hole, and the ends of said stop pins protruding from said slots whereby said pins may be drawn toward the center of said hub within said slots to retract said roll-engaging members from engagement with rolls mounted on said hub.

2. A rotatable circular hub affording means adaptable to mounting tape rolls of different widths, a roll seating flange projecting from the bottom edge of said hub, holes grouped about the circumference of said hub at various levels, said holes in each level having their bottom edges substantially adjacent a plane described by the top of one of the rolls of different width mounted in seated position on said hub, roll securing means slidably fitted within each of said holes, said securing means including a retractable pin having an end projecting from its respective hole, said projecting pin end having a relatively steep inclined surface extending from the top side edge of said hole to its tip and a shallower inclined surface extending from the bottom edge of said hole to said tip, slots in the top of said hub extending downward to intersect a hole in each of said levels and movable stop pins making engagement with each of said stop pins in said holes whereby the distance of projection of said pins from said holes is limited and retraction of said pin ends from projected position may be effected.

3. A rotatable circular hub affording means adaptable to mounting two different widths of tape roll, a roll seating flange projecting from the bottom edge of said hub, diametrically opposite radial holes at two levels in the circumferential surface of said hub, the holes in the upper of said levels being aligned parallel with the holes in the lower of said levels, spring biased roll securing means slidably fitted within each of said holes, said securing means including a retractable pin biased to a position in which an end projects from said hole, said projecting pin end having a relatively steep inclined surface extending from a point adjacent the top edge of the hole within which it is fitted and a shallower inclined surface extending from the bottom edge of said hole, slots extending from the top of said hub downwardly to intersect one of the vertically aligned radial holes in each level, and means for retracting said projecting end from said circumferential surface, said means comprising movable stop pins in each of said slots fixedly secured to the top level retractable pin with which it is associated, and slots provided in the side of the retractable pins in said lower level wherein said stop pins may make engagement with said retractable pins.

4. A rotatable hub affording means adaptable to mounting tape rolls having different widths, a roll seat provided at the bottom edge of said hub, plungers radially mounted in said hub for projection at axially spaced points through the periphery of said hub, spring means urging said plungers radially outwardly, and means limiting the radially outward movement of said plungers, said plungers being disposed to engage the outer axial ends of the different width rolls to be mounted on said hub, and said limiting means comprising an axially extending pin protruding from the axially outer end of said hub for manipulation to retract said spring-urged plungers in the removal of a roll from said hub.

References Cited in the file of this patent

UNITED STATES PATENTS

| | | |
|---|---|---|
| Re. 17,964 | Magroth | Feb. 10, 1931 |
| 431,794 | Anderson | July 8, 1890 |
| 535,617 | Foster | Mar. 12, 1895 |
| 667,849 | Morse | Feb. 12, 1901 |
| 1,111,506 | Tessier | Sept. 22, 1914 |
| 1,155,776 | Washburn | Oct. 5, 1915 |
| 1,379,408 | Holden | May 24, 1921 |
| 1,575,758 | Hasler et al. | Mar. 9, 1926 |
| 1,667,916 | Williams | May 1, 1928 |
| 1,815,250 | Gaylord | July 21, 1931 |
| 1,946,455 | Davis | Feb. 6, 1934 |
| 1,957,884 | Green | May 8, 1934 |
| 2,116,735 | Stevens | May 10, 1938 |
| 2,231,140 | Richardson | Feb. 11, 1941 |
| 2,350,549 | Eslinger | June 6, 1944 |
| 2,436,326 | Pierce | Feb. 17, 1948 |
| 2,472,240 | West | June 7, 1949 |
| 2,474,672 | Hill | June 28, 1949 |
| 2,614,761 | Camras | Oct. 21, 1952 |

FOREIGN PATENTS

| | | |
|---|---|---|
| 373,038 | Germany | Apr. 7, 1923 |
| 618,016 | France | Nov. 30, 1926 |
| 878,369 | France | Oct. 5, 1942 |